United States Patent [19]
Yamaguchi et al.

[11] Patent Number: 5,210,733
[45] Date of Patent: May 11, 1993

[54] INFORMATION RECORDING AND REPRODUCING DEVICE EMPLOYING VARIABLE DATA RECORDING CLOCK RATES

[75] Inventors: Takeshi Yamaguchi, Osakasayama; Takashi Iwaki; Hiroshi Fuji, both of Nara; Shigeo Terashima, Tenri, all of Japan

[73] Assignee: Sharp Kabushiki Kaisha, Osaka, Japan

[21] Appl. No.: 714,249

[22] Filed: Jun. 13, 1991

[30] Foreign Application Priority Data

Jun. 13, 1990 [JP] Japan .................................. 2-158066

[51] Int. Cl.$^5$ .............................................. G11B 7/00
[52] U.S. Cl. ....................................... 369/48; 369/32; 369/59; 369/44
[58] Field of Search .................. 369/44.32, 48, 47, 59, 369/58, 32, 50; 360/78.14, 51, 27, 28

[56] References Cited

U.S. PATENT DOCUMENTS

| 4,764,913 | 8/1988 | Sasaki et al. | 369/48 |
| 4,918,677 | 4/1990 | Ashinuma et al. | 369/32 |

FOREIGN PATENT DOCUMENTS

| 0080256 | 6/1983 | European Pat. Off. . |
| 57-120205 | 7/1982 | Japan . |
| 60-177404 | 9/1985 | Japan . |
| 61-131236 | 6/1986 | Japan . |
| 61-182606 | 8/1986 | Japan . |
| 8804824 | 6/1988 | PCT Int'l Appl. . |

OTHER PUBLICATIONS

European Search Report in corresponding Europeaan Patent Application issued by European Patent Office on Oct. 5, 1992.

Primary Examiner—Aristotelis Psitos
Assistant Examiner—Nabil Hindi
Attorney, Agent, or Firm—David G. Conlin; Henry D. Pahl, Jr.

[57] ABSTRACT

An information recording and reproducing device uses a disk-shaped recording medium which is rotated at a constant angular velocity. The recording medium is divided into a plurality of ring-shaped zones of concentric circles. In a recording area of the recording medium, the number of sectors per track is uniform in each zone and the number of sectors increases from an innermost zone towards an outermost zone. Each sector has a header area wherein header information including address information is recorded and a data area wherein data is recorded. In this device, data is recorded and reproduced in the data area in accordance with clock signals whose frequencies increase from the innermost zone towards the outermost zone. This device has a first clock generating circuit for generating a first clock signal of a fixed frequency, and the header information is recorded and reproduced in the header area in accordance with the first clock signal. This device also has a second clock generating circuit for generating a second clock signal having a frequency for recording and reproducing data which varies to correspond to the respective zones, and a control circuit for controlling the frequency of the second clock signal, according to reproduced header information, to correspond to a zone wherein data being recorded or reproduced.

4 Claims, 7 Drawing Sheets

INFORMATION RECORDING AND REPRODUCING DEVICE EMPLOYING VARIABLE DATA RECORDING CLOCK RATES

FIELD OF THE INVENTION

The present invention relates to an information recording and reproducing device which records and reproduces information on disk-shaped recording media such as optical disks.

BACKGROUND OF THE INVENTION

With an optical disk recording and reproducing device, each track on an optical disk is divided into a plurality of sectors, and information is recorded/reproduced on the disk sector by sector. Here, header information, such as a sector mark and address information, is recorded in each sector. The sector mark indicates a reference position of a sector and the address information the address of a sector.

The address of a sector being scanned by an optical beam is identified by reproducing the header information. This operation also enables access to the address of a desired sector.

Among recording methods for the optical disk recording and reproducing device, the following two methods, i.e. CAV (Constant Angular Velocity) method and CLV (Constant Linear Velocity) method, are well known and widely adopted. In the CAV method, data is recorded/reproduced on an optical disk in accordance with a recoding and reproduction use clock signal with a predetermined frequency while rotating the disk at a constant angular velocity. In CLV method, information is recorded/reproduced on an optical disk in accordance with a recoding and reproduction use clock signal with a predetermined frequency while rotating the disk at a constant linear velocity.

In the CAV method, while a recording density in an outer portion of a disk is lower than a recording density in an inner portion thereof, high-speed access to a desired sector is achieved. On the contrary, in the CLV method, high recording capacity is achieved as the linear recording density is constant from an inner portion to an outer portion of a disk. However, the rotating speed of the disk is controlled to keep a constant linear velocity, thereby resulting in slow access to a desired sector. Thus, the both methods have merits and demerits.

To counteract this, MCAV (Modified Constant Angular Velocity) method, which achieves an increased recording capacity of an optical disk and high-speed access to a desired sector, is suggested and put into practice. In this method, the optical disk is rotated at a constant angular velocity, and the recording area of the disk is divided into a plurality of ring-shaped zones of concentric circles so that recording and reproduction use clock signals have frequencies which increase from the innermost zone outwards.

As for access to a desired sector in an optical disk recording and reproducing device using the MCAV method, an optical beam is moved to a track belonging to the desired sector in a radial direction of the disk while stopping tracking control, and then tracking control is executed again.

At this time, if a sector being scanned by the optical beam belongs to a different zone from the desired zone whereto the desired sector belongs, the frequency of the recording and reproduction use clock signal needs to be changed to correspond to the zone by a process of trial and error in order to reproduce the header information in each sector in a track. Therefore, access time increases.

When the optical beam moves to a track in a different zone due to a tacking control failure caused by for example some defects on the optical disk, the access time also increases.

SUMMARY OF THE INVENTION

An object of the present invention is to increase a recording capacity of an optical disk and to achieve high-speed access to a desired sector.

In order to achieve the object, an information recording and reproducing device according to the present invention divides a recording area of an optical disk into a plurality of ring-shaped zones of concentric circles, arranges the number of sectors composing one track to be uniform in each zone and the number of sectors to increase from inside towards an outermost zone, rotates a disk-shaped recording medium, which is provided with a header area in each sector wherein header information such as address information is recorded and a data area wherein data is recorded, at a constant angular velocity, and records/reproduces data in the data area by using clock signals whose frequencies increase from the innermost zone towards the outermost zone.

More specifically, the present invention uses the disk-shaped recording medium whereon the header information is recorded in accordance with a clock signal with a fixed frequency, and comprises: a first clock generating circuit for generating a first clock signal corresponding to the clock signal of the fixed frequency; a second clock generating circuit for generating a second clock signal corresponding to clock signals whose frequencies for recording and reproducing data vary in each zone; a header information reproducing circuit for reproducing the header information in accordance with the first clock signal; and a control circuit for controlling the frequency of the second clock signal according to reproduced header information.

In this arrangement, during access to an arbitrary sector, the header information can be accurately reproduced in accordance with the first clock signal having the fixed frequency irrelevant to any zone. Consequently, according to the obtained header information, data can be immediately recorded and reproduced by switching a frequency of the second clock signal to a frequency assigned for a zone to which the sector belongs, which allows the access time to be shortened. Moreover, as the data is recorded and reproduced by employing the MCAV method, a recording capacity of the disk-shaped recording medium can be increased.

For a fuller understanding of the nature and advantages of the invention, reference should be made to the ensuing detailed description taken in conjunction with the accompanying drawings.

BRIEF DESCRIPTION OF THE DRAWINGS

FIG. 1 is a block diagram schematically illustrating the structure of an optical disk recording and reproducing device.

FIG. 2 is a block diagram illustrating a concrete example of a header information reproducing circuit.

FIG. 3 is a block diagram illustrating a concrete example of a second clock generating circuit.

FIG. 4 is a block diagram illustrating another concrete example of the second clock generating device.

FIG. 5 is an explanatory view illustrating the allocation of zones on an optical disk used with an information recording and reproducing device of the present invention.

FIG. 6(a)-6(e) is an explanatory view illustrating a header area and a data area on a track in each zone.

FIG. 7 is an explanatory view illustrating a format of header information.

DESCRIPTION OF THE EMBODIMENTS

Referring to FIG. 1 to FIG. 7, the following will explain an optical disk recording and reproducing device as an embodiment of the present invention.

First, an optical disk as a disk-shaped recording medium used in the optical disk recording and reproducing device of this embodiment will be discussed below.

Figure 5:
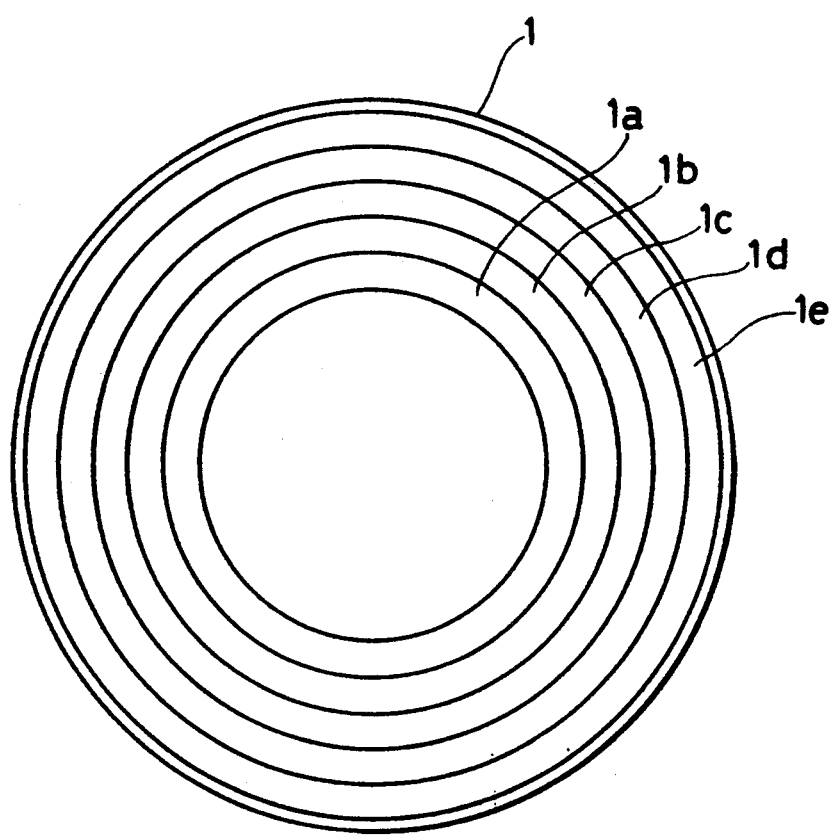

A recording area on the optical disk is divided into a plurality of ring-shaped zones of concentric circles. More specifically, as shown in FIG. 5, for example an optical disk 1 with 130 mm-diameter is divided into five zones, 1a to 1e. Each zone has 3750 tracks, and therefore the optical disk 1 totally has 18750 tracks.

Figure 6:
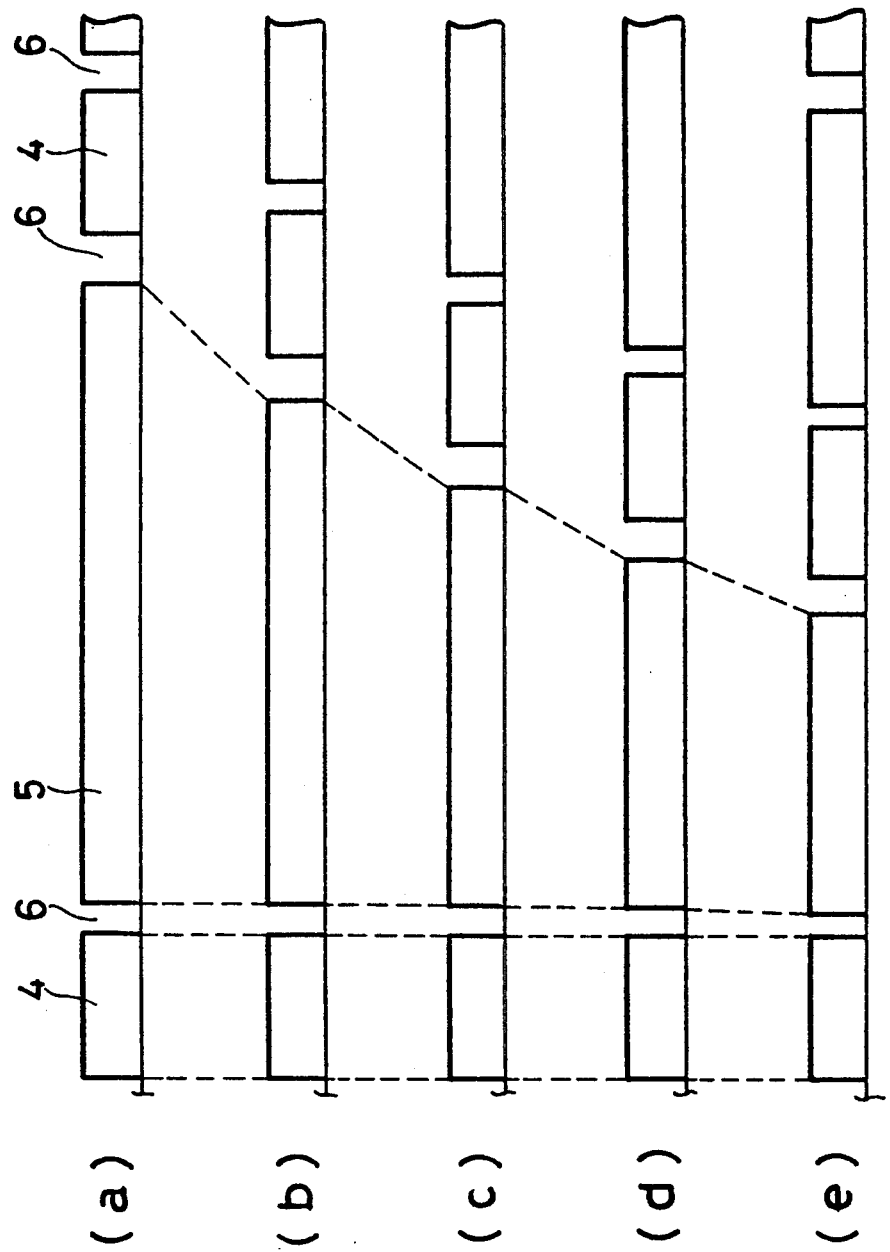

FIG. 6(a-6(e) shows the allocation of a header area 4 and a data area 5 on the tracks. Here, (a) to (e) of the figure show allocations with respect to the tracks in the zones 1a to 1e, and the horizontal axis indicates the sizes of the areas by an index of time.

The header area 4 and the data area 5 are respectively 52-byte and 1274-byte in length. One sector is composed of the header area 4, the data area 5 and a gap 6 therebetween.

The number of sectors per track increases from the innermost zone 1a towards the outermost zone 1e. More specifically, the numbers of sectors per track in the specifically, the numbers of sectors per track in the zones 1a to 1e are 17, 20, 23, 26 and 29, respectively.

This corresponds with the length of a sector on a time base which decreases from the innermost zone 1a towards the outermost zone 1e as shown by (a) to (e) of FIG. (6). This is based on the fact that the frequencies of the record and reproduction use crock signals need to be increased from the innermost zone 1a towards the outermost zone 1e in order to improve the recording capacity.

In the mean time, in this embodiment, the reproduction of the header area 4 is executed in accordance with the clock signal of the fixed frequency irrelevant to any zone, and therefore the length of the header area 4 on a time base is constant in every zone as shown in (a) to (e) of FIG. 6.

For example, when the optical disk 1 (see FIG. 5) is rotated at a constant angular velocity (e.g. 1800 rotations per minute) and (2, 7) run length limiting code is used as a recording code, data is recorded/reproduced in the data area 5 in accordance with a clock signal of a frequency of 11.0976 MHz in the zone 1a, 13.1482 MHz in the zone 1b, 15.2281 MHz in the zone 1c, 17.3377 MHz in the zone 1d, and 19.4778 MHz in the zone 1e.

Information is reproduced from the header area 4 in accordance with a clock signal of a frequency of, for example, 11.0976 MHz. The frequency used here is arranged to be equal to the frequency for recording and reproducing data in the data area 5 in the zone 1a, and it is constant in every zone as aforesaid.

Figure 7:
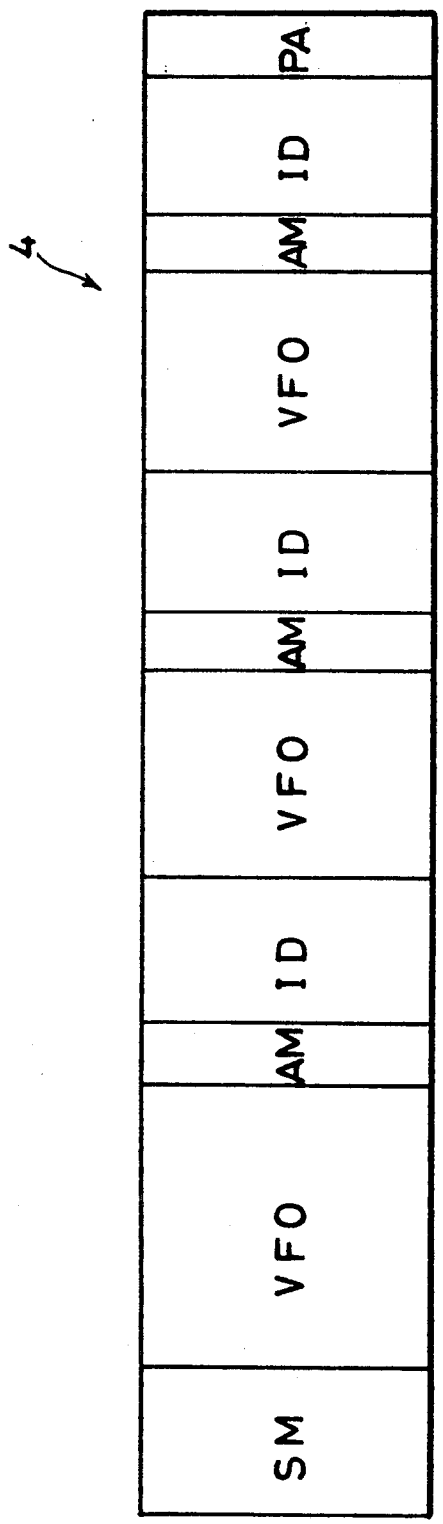

For a format of the header information in the header area 4, as shown in FIG. 7 it comprises a sector mark (SM) indicating a leading position of a sector, a pattern (VFO) for pulling into synchronization, an address mark (AM) indicating the location of address information, the address information of the sector (ID), VFO, AM, ID, VFO, AM, ID, and a postamble (PA) for stably reproducing the last ID, in this order.

Regarding a recording code for the sector mark (SM), generally, in order to discriminate it from the recording code for the data area 5 (FIG. 6), a group of patterns whose length can never be produced by any combination of data patterns is used. The sector mark (SM) is recorded by the use of a special mark created by rows of these patterns. On the contrary, the same recording code as the data area 5 is used for the address information (ID).

In this configuration, the recording area of the optical disk 1 is divided into a plurality of zones, 1a to 1e, of concentric circles (see FIG. 5) and the frequency of the recording and reproduction use clock signal is increased from the innermost zone 1a towards the outermost zone 1e in the data area 5 (see FIG. 6), which allows the length, with respect to time base, of each sector in outer portions to be decreased and the recording capacity to be increased. Moreover, as the header information can be reproduced in accordance with the clock signal of the fixed frequency, the header information is always available during the tracking control.

Consequently, even when accessing to a sector which belongs to a zone different from a sector being accessed, the access action during recording/reproduction can be immediately performed according to the address information (ID) reproduced in accordance with the clock signal of the fixed frequency, thereby shortening the access time.

Figure 1:
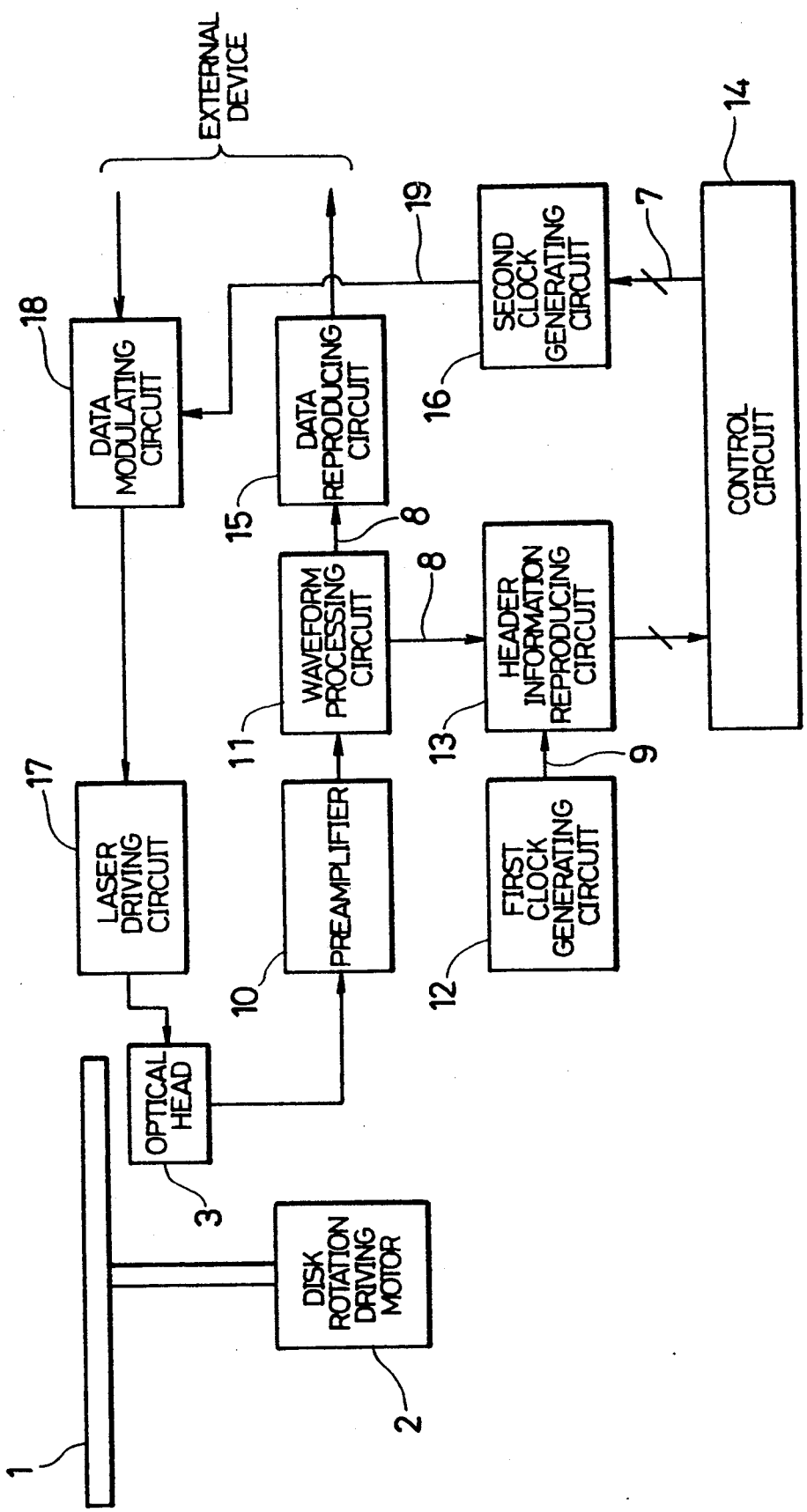
FIG. 1 to FIG. 7 shows one embodiment of the present invention.

The optical disk recording and reproducing device (information recording and reproducing device) according to the present invention uses the optical disk 1. As shown in FIG. 1, the device is composed mainly of a disk rotation driving motor 2, an optical head 3, a laser driving circuit 17, a data modulating circuit 18, a preamplifier 10, a waveform processing circuit 11, data reproducing circuit 15, a first clock generating circuit 12, a header information reproducing circuit 13, a control circuit 14, and a second clock generating circuit 16. The disk rotation driving motor 2 drives the optical disk 1 to rotate. The optical head 3 records information by irradiating laser light and reproduces information by detecting reflected light. The laser driving circuit 17 supplies a laser driving current to the optical head 3. The data modulating circuit 18 modulates recording data in accordance with a second clock signal 19 and sends the resulting output to the laser driving circuit 17. The preamplifier 10 amplifies a signal detected by the optical head 3. The waveform processing circuit 11 converts an output signal of the preamplifier 10 into a binary signal. The data reproducing circuit 15 demodulates data from a binary signal 8 (reproduced digital signal) which is released from the waveform processing circuit 11. The first clock generating circuit 12 generates a first clock signal 9 of a frequency for reproducing the header information. The header information reproducing circuit 13 reproduces the header information from the binary signal 8 which is released from the waveform processing circuit 11 in accordance with the first clock signal 9. The control circuit 14 sends a control signal 7 to the second clock generating circuit 16. The control signal 7 switches a frequency of the second clock signal 19 into a frequency corresponding to one of the zones 1a to 1e, according to the address information (ID) released from the header information reproducing circuit 13. According to the control signal 7 from the control circuit 14, the second clock generating circuit 16 outputs the second clock signal 19 having an assigned frequency for recording data.

In the above configuration, the optical disk 1 is driven by the disk rotation driving motor 2 such that it rotates at a constant angular velocity. In this embodiment, the disk 1 rotates at a constant angular velocity (e.g. 1800 rotations per minute).

During recording, recording data from an external device (not shown) is input to the data modulating circuit 18 and modulated into a form of, for example, (2, 7) run length limiting code.

According to the second clock signal 19 of the assigned frequency which is released from the second clock generating circuit 16, the modulated data is sent to the laser driving circuit 17. The laser driving circuit 17 supplies a laser driving current, which varies according to the input modulated data, to the optical head 3.

According to the laser driving current, the amount of light irradiated on the optical disk 1 from the optical head 3 is controlled, and the information is recorded in the data area 5 by the so-called light modulating method.

For example, in case of the optical disk 1 with perforated pits, when a light beam of strong intensity is irradiated on the disk, the temperature of the portion whereon the light beam is irradiated rises and a pit as a recording bit is formed on the recording medium, whereby information is recorded.

Meanwhile, during reproduction, a light beam with a constant intensity is irradiated on the optical disk 1 from the optical head 3. The amount of the light beam is such small that it does not make a recording bit on the disk 1. Reflected light corresponding to the recorded information is detected by the optical head 3, converted into an electric signal, and sent to the preamplifier 10 where the signal is amplified at a predetermined amplification factor.

An output of the preamplifier 10 is sent to the waveform processing circuit 11 where it is filtered and converted into a binary signal, and then the resulting binary signal 8 is respectively sent to the data reproducing circuit 15 and the header information reproducing circuit 13.

In the data reproducing circuit 15, data is demodulated from the signal 8 in accordance with a clock signal, and the demodulated data is then sent as reproduced data to the external device. The clock signal has a frequency substantially equal the frequency of the second clock signal 19 from the second clock generating circuit 16.

Meanwhile, in the header information reproducing circuit 13, header information is reproduced from the binary signal 8 in accordance with the first clock signal 9 of the fixed frequency output from the first clock generating circuit 12. In other words, by detecting a sector mark (SM), a leading position of a sector is determined, and address information (ID) is reproduced and sent to the control circuit 14.

Figure 2:
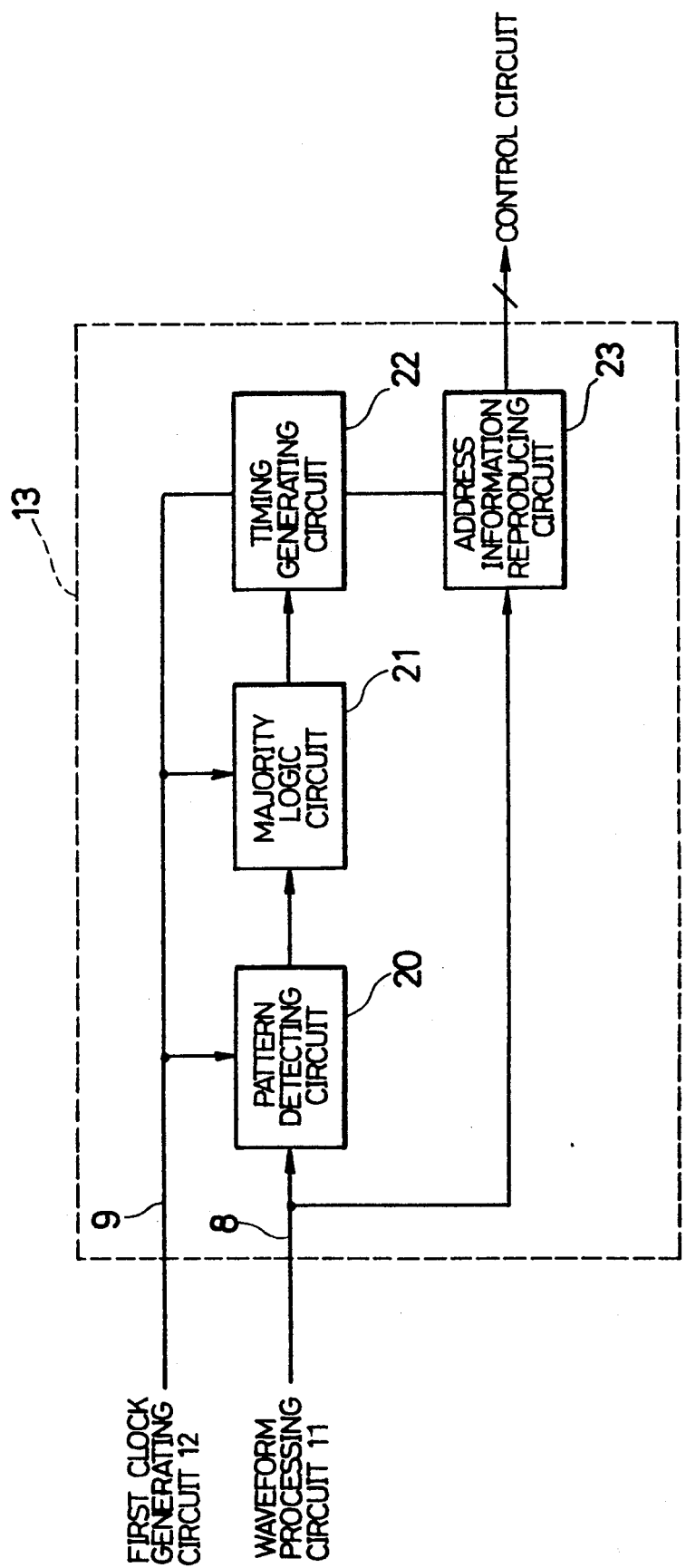

More specifically, as shown in FIG. 2, the header information reproducing circuit 13 comprises, for example, a pattern detecting circuit 20, a majority logic circuit 21, a timing generating circuit 22, and an address information reproducing circuit 23. The pattern detecting circuit 20 detects a pattern used for a sector mark (SM) from the binary signal 8 released from the waveform processing circuit 11, and outputs the resulting detected pulses. The majority logic circuit 21 detects the sector mark by counting the detected pulses, and outputs sector mark detection pulses. According to the sector mark detection pulses, the timing generating circuit 22 outputs timing pulses for reproducing the address information (ID). According to the timing pulses, the address information reproducing circuit 23 reproduces the address information (ID) from the binary signal 8 released from the waveform processing circuit 11, and outputs it to the control circuit.

With the configuration of the header information reproducing circuit 13, according to the number of clock pulses of the first clock signal 9 which is counted between the pulse edges of the binary signal 8, the pattern of the sector mark (SM) is detected in the pattern detecting circuit 20, and the detected pulses are then sent to the majority logic circuit 21.

In the majority logic circuit 21, the input detected pulses are counted, and if they exceed a preset number, they are verified as the sector mark (SM). Namely, the detection of the sector mark is executed according to the so-called majority logic.

In the timing generating circuit 22, according to the sector mark detection pulses from the majority logic circuit 21, the timing pulses for reproducing the address information (ID) are generated. In the address information reproducing circuit 23, according to the timing pulses, the address information (ID) is reproduced from the binary signal 8 and then sent to the control circuit 14.

Figure 3:
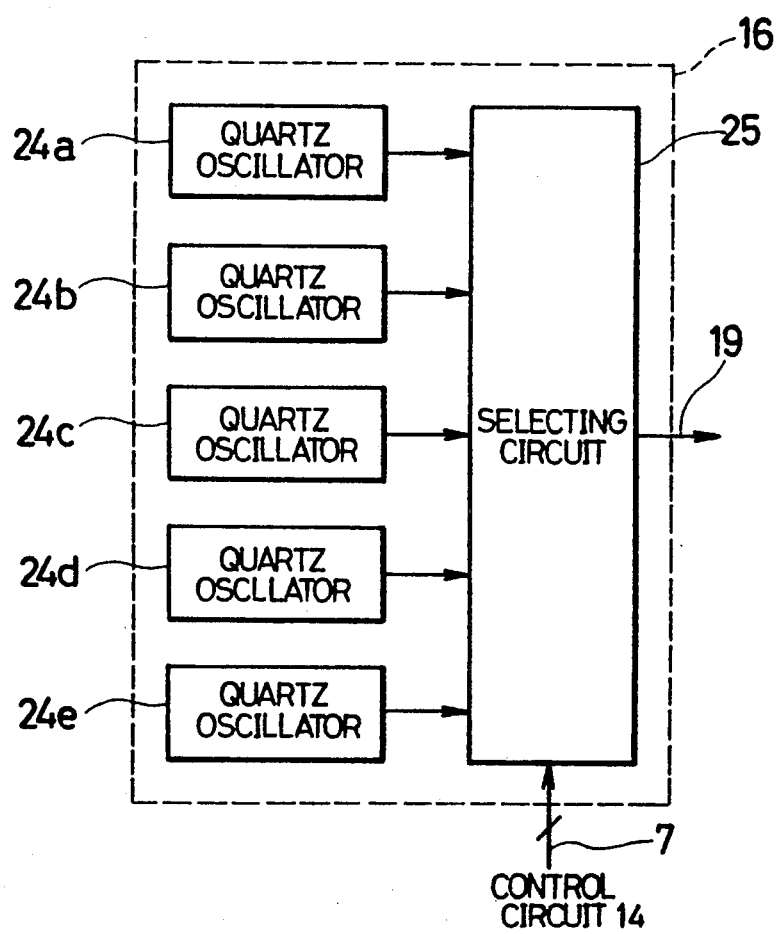

As aforesaid, according to the control signal 7 from the control circuit 14, the second clock generating circuit 16 (see FIG. 1) outputs the second clock signal 19 of an assigned frequency for recording data. More precisely, as shown in FIG. 3, the second clock generating circuit 16, for example, comprises quartz oscillators 24a to 24e and a selecting circuit 25 which selects one oscillator from the quartz oscillators 24a to 24e according to the control signal 7 from the control circuit 14 and outputs it.

With the configuration of the second clock generating circuit 16, the oscillation frequencies of the quartz oscillators 24a to 24e respectively correspond to the frequencies of the recording and reproduction use clock signals for five zones 1a to 1e of the optical disk 1 (see FIG. 5), and signals of five different frequencies are input to the selecting circuit 25.

In the selecting circuit 25, according to the control signal 7 from the control circuit 14, one of clock signals whose frequencies for recording and reproduction correspond to the respective zones, 1a to 1e, is selected and released as the second clock signal 19 to the data modulating circuit 18.

As aforesaid, the device in this embodiment has two separate clock generating circuits, i.e. the first clock generating circuit 12 (see FIG. 1) and the second clock generating circuit 16. However, the present invention is not restricted to this configuration. For instance, when the reproduction of the header information and the recording/reproduction in the zone 1a are executed in accordance with clock signals of the same frequency like the optical disk 1, the quartz oscillating circuit 24a can serve as the first clock generating circuit 12, and therefore the number of parts can be decreased.

Figure 4:
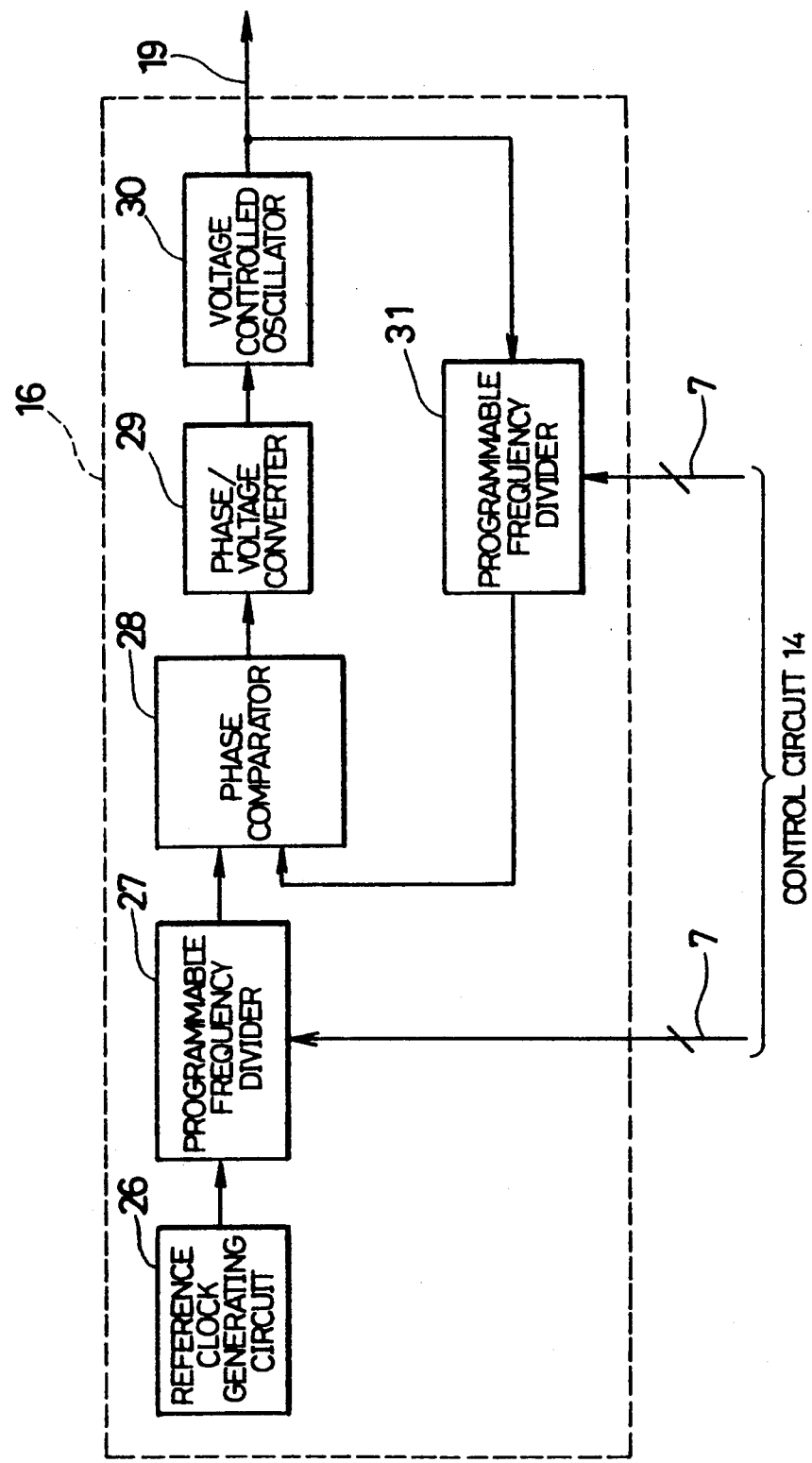

Moreover, the quartz oscillators 24a to 24e are used as the second clock generating circuit 16 in FIG. 3. However, the present invention is not restricted to this concrete configuration, and for example, a PLL (Phase Locked Loop) may be used as shown in FIG. 4.

In this case, the second clock generating circuit 16 comprises a reference clock generating circuit 26, a programmable frequency divider 27, a phase comparator 28, a phase/voltage converter 29, a voltage controlled oscillator 30, and a programmable frequency divider 31. The reference clock generating circuit 26 generates a reference clock. The programmable frequency divider 27 reduces the frequency of the reference clock by a dividing factor which varies according to the control signal 7 from the control circuit 14. The phase comparator 28 compares a phase of an output of the programmable frequency divider 27 with that of the programmable frequency divider 31 and detects a difference between the phases. The phase/voltage converter 29 converts the detected difference into voltage accordingly. The voltage controlled oscillator 30 generates a clock signal of a frequency which varies according to an output voltage from the phase/voltage converter 29. The programmable frequency divider 31 reduces the frequency of clock signal from the voltage controlled oscillator 30 by a dividing factor which varies according to the control signal 7 from the control circuit 14 (see FIG. 1).

With the configuration of the second clock generating circuit 16, the dividing factor of the programmable frequency divider 27 is controlled by the control signal 7 from the control circuit 14. In other words, the frequency of the reference clock signal from the reference clock generating circuit 26 is reduced by the dividing factor. The resulting clock signal having the reduced frequency is sent to the phase comparator 28.

In the mean time, an output of the voltage controlled oscillator 30 is sent to the programmable frequency divider 31 where its frequency is reduced by the dividing factor which varies according to the control signal 7 from the control circuit 14, and then sent to the phase comparator 28.

In the phase comparator 28, phases of the signals sent from the programmable frequency divider 27 and the programmable frequency divider 31 are compared with each other, and a detected phase difference between the phases is sent to the phase/voltage converter 29. In the phase/voltage converter 29, the detected difference is converted into voltage which also varies accordingly, and is then sent to the voltage controlled oscillator 30.

By executing PLL control, information is recorded/reproduced in the zones 1a to 1e in accordance with the second clock signal 19 that is a clock signal having the frequency reduced by the programmable frequency divider 27.

For example, when the frequency of the reference clock signal is set at 11.0976 MHz (using a clock signal of this frequency, information is recorded/reproduced in the zone 1a (see FIG. 5)) and a dividing factor M of the programmable frequency divider 27 and a dividing factor N of the programmable frequency divider 31 are respectively set at 92 and 109, the second clock signal 19 from the voltage controlled oscillator 30 has a frequency of 13.1482 MHz (using a clock signal of this frequency, information is recorded/reproduced in the zone 1b (see FIG. 5)).

Similarly, when the dividing factors (M and N) of the frequency dividers 27 and 31 are respectively set at 43 and 59, the second clock signal 19 from the voltage controlled oscillator 30 has a frequency of 15.2269 MHz (using a clock signal of this frequency, information is recorded/reproduced in the zone 1c (see FIG. 5)).

When the dividing factors (M and N) of the programmable frequency dividers 27 and 31 are respectively set at 16 and 25, the second clock signal 19 from the voltage controlled oscillator 30 has a frequency of 17.3400 MHz (using a clock signal of this frequency, information is recorded/reproduced in the zone 1d (see FIG. 5)).

When the dividing factors (M and N) of the programmable frequency dividers 27 and 31 are respectively set at 49 and 86, the second clock signal 19 from the voltage controlled oscillator 30 has a frequency of 19.4774 MHz (using a clock signal of this frequency, information is recorded/reproduced in the zone 1e (see FIG. 5)).

While the second clock signal 19 may have a frequency which is slightly different from the assigned frequency of the recording and reproduction use clock signal, the difference can be easily compensated by providing safety margins for the entire optical disk recording and reproducing device, for example giving the gaps 6 to the respective sectors (see FIG. 6), and therefore this is not a serious problem.

As aforesaid, when the second clock generating circuit 16 is composed of the PLL, the frequency of the second clock signal 19 can be varied by changing the combination of the dividing factors (M and N) of the programmable frequency dividers 27 and 31. Therefore, even when the number of zones arranged on the optical disk is greater than the present five zones 1a to 1e, there is no need for increasing the number of parts.

The numeric values used for specifying the number of zones on the optical disk 1, the number of sectors per track and other numbers are just examples, and therefore this invention is not restricted to these values.

In this embodiment, an optical disk recording and reproducing device is explained, however the same may be applicable to optical disk reproducing devices.

As for the optical disk 1, a read only optical disk such as a compact disk, a write once optical disk of etching type, and an erasable optical disk such as a magneto-optical disk may be used.

As aforesaid, the information recording and reproducing device of the present invention uses the disk type recording medium whereon the header information is recorded in accordance with the clock signal of the fixed frequency, and comprises: the first clock generating circuit for generating the first clock signal corresponding to the clock signal of the fixed frequency, the second clock generating circuit for generating the second clock signal corresponding to the clock signals whose frequencies for recording and reproduction vary in each zone; the header information reproducing circuit for reproducing the header information in accordance with the first clock signal; and the control circuit for controlling the frequency of the second clock signal according to the reproduced header information.

Thus, during access to an arbitrary sector, the header information can be accurately reproduced in accordance with the first clock signal of the fixed frequency irrelevant to any zone. Consequently, according to the obtained header information, data can be immediately recorded/reproduced by switching a frequency of the second clock signal to a frequency assigned for a zone whereto the sector belongs, thereby resulting in a significant decrease in the access time.

Besides, even when a sector in a different zone is accessed due to tracking control failure caused by some disk defects, information on the header area can be reproduced in accordance with the clock signal of the fixed frequency in the same manner as above, and therefore the access time can never be increased.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An information recording and reproducing device for recording and reproducing data in a data area of a disk-shaped recording medium in accordance with clock signals whose frequencies increase from an innermost zone of the recording medium towards an outermost zone thereof, the recording medium being divided into a plurality of ring-shaped zones of concentric circles, the number of sectors per track being uniform in each zone, the number of sectors composing one track increasing from the innermost zone towards the outermost zone, each sector having a header area wherein header information including address information is recorded and the data area wherein data is recorded, the recording medium being rotated at a constant angular velocity, comprising:

first clock generating means for generating a first clock signal of a fixed frequency;

second clock generating means for generating a second clock signal having a frequency which varies in each zone;

header information reproducing means for reproducing the header information in accordance with the first clock signal, said header information reproducing means comprising:

pattern detecting means for detecting a pattern used as a sector mark for indicating a leading position of a sector according to the number of clock pulses of the first clock signal counted between pulse edges of reproduced digital signal from the recording medium, and outputting detection pulses;

majority logic means for counting the detection pulses, detecting a sector mark by verifying if the counted value of the detection pulses exceeds a predetermined value, and outputting sector mark detection pulses;

timing generating means for outputting timing pulses for reproducing the address information according to the sector mark detection pulses; and address information reproducing means for reproducing the address information from the reproduced digital signal according to the timing pulses, and outputting it to a controlling means; and controlling means for controlling the frequency of the second clock signal so as to correspond to a zone wherein data being recorded or reproduced, according to the reproduced header information, wherein the header information is recorded in the header area in accordance with the first clock signal, and data is recorded and reproduced in the data area in each zone in accordance with the second clock signal.

2. An information recording and reproducing device for recording and reproducing data in a data area of a disk-shaped recording medium in accordance with clock signals whose frequencies increase from an innermost zone of the recording medium towards an outermost zone thereof, the recording medium being divided into a plurality of ring-shaped zones of concentric circles, the number of sectors per track being uniform in each zone, the number of sectors composing one track increasing from the innermost zone towards the outermost zone, each sector having a header area wherein header information including address information is recorded and the data area wherein data is recorded, the recording medium being rotated at a constant angular velocity, comprising:

first clock generating means for generating a first clock signal of a fixed frequency;

second clock generating means for generating a second clock signal having a frequency which varies in each zone;

header information reproducing means for reproducing the header information in accordance with the first clock signal; and controlling means for controlling the frequency of the second clock signal so as to correspond to a zone wherein data being recorded or reproduced, according to the reproduced header information, said second clock generating means comprising:

reference clock generating means for generating a reference clock signal;

a first programmable frequency divider for dividing the frequency of the reference clock signal according to a control signal from said controlling means;

a phase comparator for comparing phases of two signals input thereto, and detecting a phase difference between the phases;

a converter for converting the phase difference into voltage;

a voltage controlled oscillator for outputting a clock signal having a frequency, which varies according to an output voltage from said converter, as the second clock signal; and a second programmable frequency divider for dividing the frequency of the second clock signal from said voltage controlled oscillator by a dividing factor which varies according to the control signal from said controlling means, an output of said first programmable frequency divider and an output of said second programmable frequency divider being input to said phase comparator;

wherein the header information is recorded in the header area in accordance with the first clock signal, and data is recorded and reproduced in the data area in each zone in accordance with the second clock signal.

3. An information recording and reproducing device for recording and reproducing data in a data area of an optical disk in accordance with clock signals whose frequencies increase from an innermost zone of the recording medium towards an outermost zone thereof, the recording medium being divided into a plurality of ring-shaped zones of concentric circles, the number of sectors per track being uniform in each zone, the number of sectors per track increasing from the innermost zone towards the outermost zone, each sector having a header area wherein header information including address information is recorded and the data area wherein data is recorded, the recording medium being rotated at a constant angular velocity, comprising:

an optical head;

a waveform processing circuit for amplifying a signal corresponding with reproduced light detected by said optical head, from the optical disk, converting the signal into a binary signal, and outputting it as a reproduced digital signal;

a first clock generating circuit for generating a first clock signal of a fixed frequency for recording and reproducing the header information;

a header information reproducing circuit for reproducing the header information including the address information from the reproduced digital signal from said waveform processing circuit in accordance with the first clock signal, said header information reproducing circuit comprising:

a pattern detecting circuit for detecting a pattern used as a sector mark indicating a leading position of a sector according to the number of clock pulses of the first clock signal counted between pulse edges of the reproduced digital signal, and outputting detection pulses;

a majority logic circuit for counting the number of detection pulses, detecting the sector mark by verifying if the counted value of the detection pulses exceeds a predetermined value, and outputting sector mark detection pulses;

a timing generating circuit for outputting timing pulses used for reproducing the address information according to the sector mark detector pulses; and an address information reproducing circuit for reproducing the address information from the reproduced digital signal according to the timing pulses, and outputting it to a control circuit;

a second clock generating circuit for outputting a second clock signal having a frequency assigned for recording data in the data area according to a control signal from a control circuit, wherein said control circuit according to the address information reproduced in said header information reproducing circuit, the control signal switches the frequency of the second clock signal to a frequency corresponding to one of the zones.

4. An information recording and reproducing device for recording and reproducing data in a data area of an optical disk in accordance with clock signals whose frequencies increase from an innermost zone of the recording medium towards an outermost zone thereof, the recording medium being divided into a plurality of ring-shaped zones of concentric circles, the number of sectors per track being uniform in each zone, the number of sectors per track increasing from the innermost zone towards the outermost zone, each sector having a header area wherein header information including address information is recorded and the data area wherein data is recorded, the recording medium being rotated at a constant angular velocity, comprising:

an optical head;

a waveform processing circuit for amplifying a signal corresponding with reproduced light detected by said optical head, from the optical disk, converting the signal into a binary signal, and outputting it as a reproduced digital signal;

a first clock generating circuit for generating a first clock signal of a fixed frequency for recording and reproducing the header information;

a header information reproducing circuit for reproducing the header information including the address information from the reproduced digital signal from said waveform processing circuit in accordance with the first clock signal; and a second clock generating circuit for outputting a second clock signal having a frequency assigned for recording data in the data area according to a control signal from a control circuit, said second clock generating circuit comprising:

a reference clock generating circuit for generating a reference clock signal;

a first programmable frequency divider for dividing the frequency of the reference clock signal according to the control signal;

a phase comparator for comparing phases of two signals input thereto, and detecting a phase difference between the phases;

a converter for converting the phase difference into voltage;

a voltage controlled oscillator for outputting a clock signal having a frequency, which varies according to an output voltage from said converter, as the second clock signal; and a second programmable frequency divider for dividing the frequency of the second clock signal from said voltage controlled oscillator by a dividing factor which varies according to the control signal, wherein an output of said first programmable frequency divider and an output of said second programmable frequency divider are input to said phase comparator, and wherein said control circuit releases the control signal to said second clock generating circuit according to the address information reproduced in said header information reproducing circuit, the control signal switches the frequency of the second clock signal to a frequency corresponding to one of the zones and data is recorded and reproduced in the respective zones according to the second clock signal.

* * * * *